US009277472B1

(12) United States Patent
Price et al.

(10) Patent No.: US 9,277,472 B1
(45) Date of Patent: Mar. 1, 2016

(54) DETERMINING USER EXPERIENCE METRICS FOR DIFFERENT COMMUNICATION NETWORKS

(75) Inventors: Andrew D. Price, Cupertino, CA (US);
Mete Rodoper, Sunnyvale, CA (US);
Kiran K. Edara, Cupertino, CA (US)

(73) Assignee: Amazon Technologies, Inc., Reno, NV (US)

( * ) Notice: Subject to any disclaimer, the term of this patent is extended or adjusted under 35 U.S.C. 154(b) by 156 days.

(21) Appl. No.: 13/603,156

(22) Filed: Sep. 4, 2012

(51) Int. Cl.
*H04W 36/36* (2009.01)
*H04W 36/30* (2009.01)
*H04W 72/06* (2009.01)
*H04W 48/18* (2009.01)
*H04W 24/02* (2009.01)

(52) U.S. Cl.
CPC ............ *H04W 36/30* (2013.01); *H04W 36/365* (2013.01); *H04W 48/18* (2013.01); *H04W 72/06* (2013.01); *H04W 24/02* (2013.01)

(58) Field of Classification Search
CPC ... H04L 43/045; H04L 65/80; H04L 43/0852; H04L 43/08; H04L 43/50; H04L 12/581; H04L 12/588; H04L 12/5895; H04L 51/04; H04L 51/32; H04L 67/18; H04L 67/306; H04L 69/24; H04L 1/0026; H04W 4/003; H04W 24/00; H04W 48/16; H04W 80/04; H04W 84/12; H04W 88/06; H04W 88/08; H04W 84/18; H04W 4/02; H04W 4/021; H04W 28/06; H04W 8/005; H04W 24/10; H04W 4/001; H04W 4/023; H04W 4/206; H04W 84/10; H04W 88/02; H04W 24/08; H04W 64/006; H04W 72/1231; H04W 8/18; H04W 28/16; H04W 28/22; H04W 36/0066; H04W 40/12; H04W 4/06; H04W 36/365; H04W 48/00; H04W 48/10; H04W 48/18; H04W 72/06; H04W 24/02; G06F 17/30241; G06F 3/0483; G06F 3/0482; H04B 17/003; H04B 7/0632
USPC ............ 370/252, 328, 339, 342, 230.1, 338, 370/254; 709/201–253, 200; 455/414.1, 455/550.1, 436, 422.1, 456.3, 423, 67.11, 455/457; 715/717, 727, 771, 779, 864
See application file for complete search history.

(56) References Cited

U.S. PATENT DOCUMENTS

| | | | | |
|---|---|---|---|---|
| 2007/0157094 | A1* | 7/2007 | Lemay et al. | 715/717 |
| 2008/0102815 | A1* | 5/2008 | Sengupta et al. | 455/424 |
| 2008/0113683 | A1* | 5/2008 | Paas et al. | 455/552.1 |
| 2009/0005061 | A1* | 1/2009 | Ward et al. | 455/456.1 |
| 2009/0249247 | A1* | 10/2009 | Tseng et al. | 715/808 |
| 2010/0091677 | A1* | 4/2010 | Griff et al. | 370/252 |
| 2010/0333028 | A1* | 12/2010 | Welsh et al. | 715/833 |
| 2011/0143775 | A1* | 6/2011 | Liu et al. | 455/456.3 |
| 2011/0238779 | A1* | 9/2011 | Little et al. | 709/217 |
| 2011/0307598 | A1* | 12/2011 | Orr et al. | 709/224 |

(Continued)

*Primary Examiner* — Marcus R Smith
*Assistant Examiner* — Rose Clark
(74) *Attorney, Agent, or Firm* — Lowenstein Sandler LLP

(57) ABSTRACT

One or more user experience metrics are obtained for one or more types of wireless communication networks. One or more user experience indicators may be displayed on a screen in conjunction with a signal strength indicator. Different sets of user experience metrics may also be obtained, each set being associate with an application on a user device. Each set of user experience metrics may be displayed in conjunction with a list of applications. A user may provide user input selecting a wireless communication network and the user device may be configured to use the selected wireless communication network.

15 Claims, 9 Drawing Sheets

(56) References Cited

U.S. PATENT DOCUMENTS

| | | | |
|---|---|---|---|
| 2012/0028643 A1* | 2/2012 | Falchuk et al. | 455/436 |
| 2013/0054738 A1* | 2/2013 | Borges et al. | 709/217 |
| 2013/0055136 A1* | 2/2013 | Aaron et al. | 715/772 |
| 2013/0121145 A1* | 5/2013 | Draznin et al. | 370/230 |
| 2013/0166731 A1* | 6/2013 | Yamanaka et al. | 709/224 |
| 2013/0331141 A1* | 12/2013 | Montemurro | 455/515 |
| 2014/0068433 A1* | 3/2014 | Chitturi | 715/716 |

\* cited by examiner

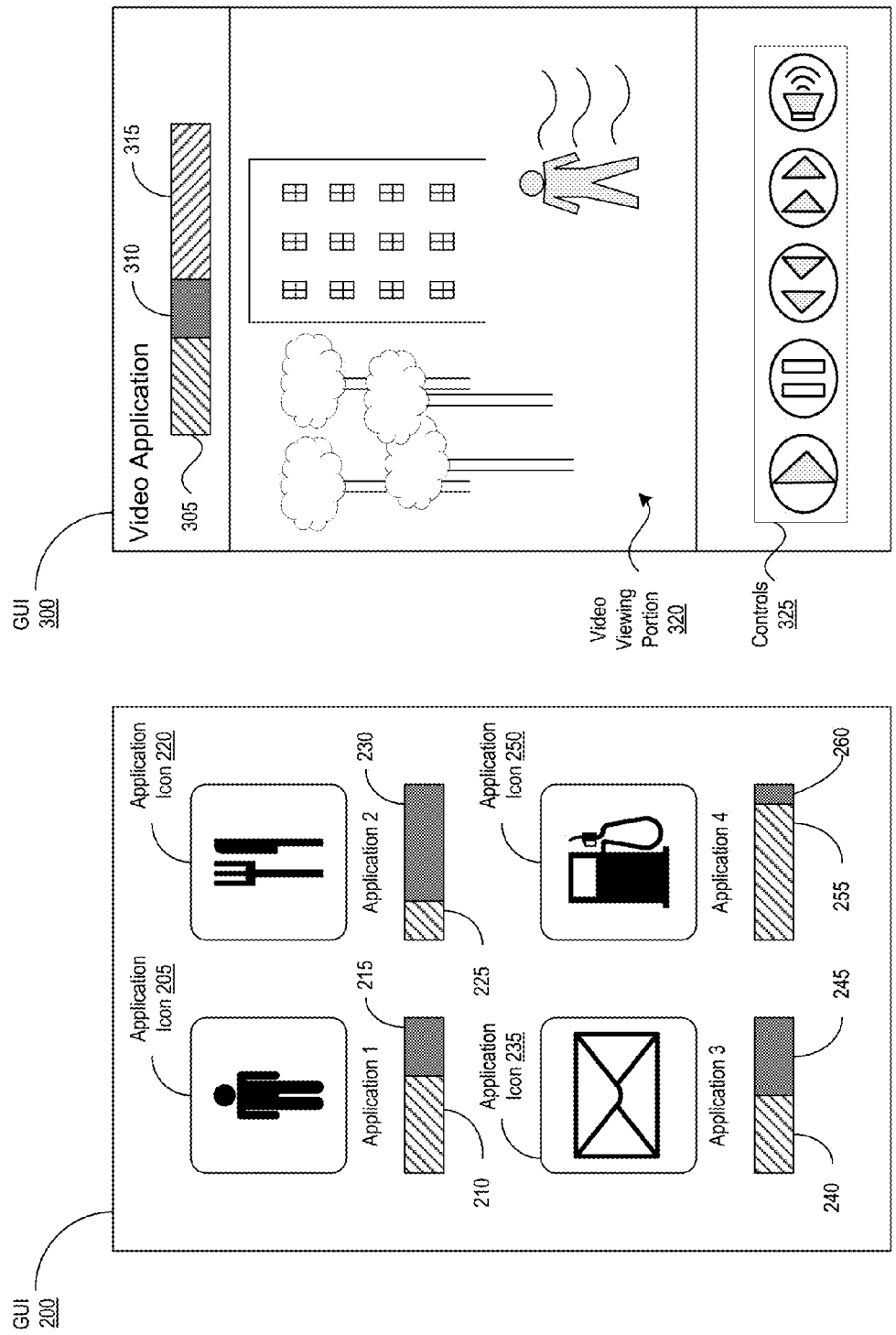

DETERMINING USER EXPERIENCE METRICS FOR DIFFERENT COMMUNICATION NETWORKS

BACKGROUND

A large and growing population of users enjoys entertainment through the consumption of media items, including electronic media, such as electronic books (also referred to herein as ebooks), electronic newspapers, electronic magazines and other electronic reading material. Users employ various electronic devices to consume such publications. Among these electronic devices are electronic book readers, cellular telephones, personal digital assistants (PDAs), smart phones, portable media players, tablet computers, electronic pads, netbooks, desktop computers, notebook computers and the like.

These electronic devices (e.g., user devices) often use wireless communication networks, wired communication networks (e.g., Ethernet networks) or other networks to download or upload digital media items. In addition, applications (e.g., streaming video applications, online banking applications, social network applications, browsers, email applications, etc.) may also user the communication networks to transmit or receive data (e.g., may receive email or may watch streaming videos using the wireless communication networks). The wireless communication networks or systems may be cellular (e.g., wireless wide area networks) such as Code Division Multiple Access (CDMA) networks, High Speed Packet Access Plus (HSPA+) Long Term Evolution (LTE) networks, Worldwide Interoperability for Microwave Access (WiMAX) networks, Global System for Mobile Communication (GSM) networks, etc. The wireless communication networks may also include WiFi (e.g., wireless local area networks) such as 802.11g networks, 802.11n network, etc. Some wireless communication networks may use multiple-input-multiple-output (MIMO) communication protocols (e.g., LTE networks, LTE Advanced networks, WiMAX networks, 802.11n networks, 802.11ac networks, etc.).

An electronic device will often display a signal strength indicator within the display of the electronic device. The signal strength indicator may be a graphical representation of the strength of a radio signal received from a wireless communication network. For example, a smart phone (or cellular phone) may display "signal bars" in the upper portion of a screen to indicate the strength of radio signals received from an LTE or an HSPA+ network. In another example, a tablet or an electronic reader may display signal bars to indicate the strength of radio signals received from an 802.11n network.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

FIG. 2 is a diagram illustrating an exemplary graphical user interface (GUI) which may be displayed by a user device, according to one embodiment.

FIG. 3 is a diagram illustrating an exemplary graphical user interface (GUI) which may be displayed by a user device, according to another embodiment.

DETAILED DESCRIPTION

Figure 1:
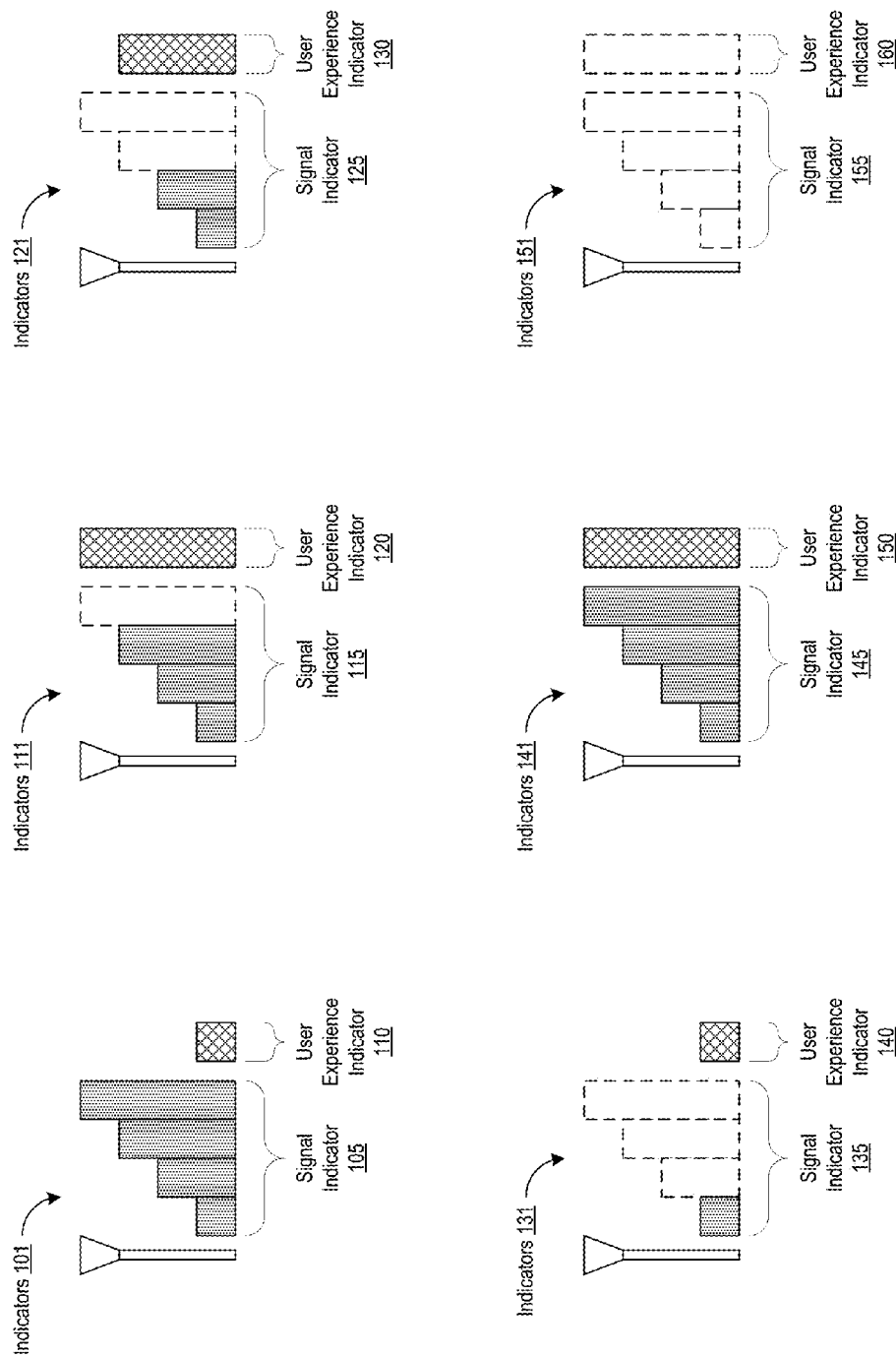
FIG. 1 is a block diagram illustrating exemplary indicators which may be displayed by a user device.

Although a user device (e.g., an electronic device) may display indicators (e.g., signal bars) of radio signal strength of radio signal received from wireless communication networks (e.g., the strength of a radio signal from an LTE network or an 802.11n network), these indicators may not be indicative of the quality of a user's experience when or if the user uses the user device and the wireless communication network. For example, although the radio signal strength of a wireless communication network may be strong (e.g., four or five signal bars), the cell tower (e.g., NodeB) that the user device is using may be congested (e.g., many other user devices may also be using the same cell tower NodeB). This may decrease the throughput of data for the user device because other users are also transmitting or receiving data using the same cell tower. In another example, although the radio signal strength of a wireless communication network may be strong, the latency to transmit or receive data using the wireless communication network (e.g., the time to send data and to receive a confirmation that the data was received) may be large, which results in slower throughput for the user device. Thus, typical radio signal strength indicators (e.g., signal bars) may not be indicative of what the user may experience when using a wireless communication network.

Systems and methods in accordance with various embodiments of the present disclosure provide the ability for users to view an indication of different user experience metrics for different communication networks. The user experience metrics may be based on many user experience factors and may provide a more accurate indication of the quality of the user's experience (what the user may perceive or may experience) when or if the user uses a communication network. For example, a user experience metric may be based on one or more of the signal strength for a wireless communication network, a time of day, a power level of the user device, a location of the user device, a cost associated with the wireless communication network, a communication state of the user device, a type of the wireless communication network, a security requirement for the user device or for applications on the user device, one or more requirements of an application executing on the user device, a queue length of data queues in the user device, an error rate for transmitting or receiving data, a latency for data, etc. By analyzing a plurality of these user experience factors and determining a user experience metric for one or more communication networks, a user device may provide a more accurate indication of a user's experience (e.g., conditions, factors, or perceptions that the user may experience or perceive) while using the one or more communication networks. An indicator of the quality of the user's experience (e.g., an indicator bar, a numerical value, etc.) may be displayed to the user. The user experience indicator may be based on the user experience metric determined or calculated by the user device.

The quality of the user's experience when using a wireless communication network may be affected by the user's perception of how fast the user is able to transmit or receive data using the wireless communication network (e.g., the amount of time to load a web page after the user starts a web browser to access the web page), the number of errors in data that is transmitted or received by user device (e.g., how many errors appear in a streaming video being watched by a user), the cost (e.g., monetary cost) associated with using a communication network, the battery power used when communicant with a communication network and security issues (e.g., level or strength of encryption), the thermal state or temperature of the user device (e.g., how hot the user device is), the proximity of the user device to the user (e.g., how close the user device is to the user), whether data can be intercepted when using the communication network, etc.

FIG. 1 is a block diagram illustrating exemplary sets of indicators 101, 111, 121, 131, 141 and 151, which may be displayed by a user device. The sets of indicators 101, 111, 121, 131, 141 and 151 may indicate the signal strength of a radio signal received from a wireless communication network and may also indicate the quality of the user's experience when the using the wireless communication network. In one embodiment, a user's experience (e.g., the user experience) may include conditions, factors, impressions, observations, and/or perceptions that a user may have or may experience when or if the user uses a wireless communication network (e.g., when the user uses a device that uses the wireless communication network). The indicators 101, 111, 121, 131, 141 and 151 provided by a user device (e.g., a smart phone, a tablet computer, an electronic book reader, etc.) may allow a user to better determine the quality of the user's experience when using the wireless communication network. Each set of indicators 101, 111, 121, 131, 141 and 151 includes a signal indicator and a user experience indicator. A signal indicator may indicate one of five levels of radio signal strength, ranging from "no signal" (e.g., as illustrated with signal indicator 155) to "excellent" (e.g., illustrated as signal indicator 105). The user experience indicator may indicate one of five levels of quality for the user experience, ranging from "no signal" (e.g., as illustrated with user experience indicator 160) to "excellent" (e.g., as illustrated with user experience indicator 120). Although the signal indicators and the user experience indicators are shown using five levels, in other embodiments, any number of levels may be displayed. For example, a signal indicator may use four levels, while a user experience indicator may use six levels.

The set of indicators 101 includes a signal indicator 105 and a user experience indicator 110. The signal indicator 105 includes four "signal bars" which indicate that a user device is receiving a strong radio signal from the wireless communication network (e.g., excellent signal). The user experience indicator 110 indicates that the user may have a poor user experience when using the wireless communication network because the height of the user experience indicator 110 is the same as the height of the left most signal bar (e.g., the second level).

The set of indicators 111 includes a signal indicator 115 and a user experience indicator 120. The signal indicator 115 includes three signal bars (e.g., indicating good radio signal strength). The right most signal bar is outlined with dotted lines to indicate that the right most signal bar is not displayed, because the radio signal from the wireless communication network is not as strong as shown in signal indicator 105. The user experience indicator 120 indicates that the user may have an excellent user experience even though the radio signal is not as strong as shown in the signal indicator 105 (e.g., the user experience indicator is at the highest level or fifth level).

The set of indicators 121 includes a signal indicator 125 and a user experience indicator 130. The signal indicator 125 includes two signal bars (e.g., indicating moderate radio signal strength). The two right most signal bars are outlined with dotted lines to indicate that the two right most signal bars are not displayed, because the radio signal from the wireless communication network is not as strong as shown in signal indicators 105 and 115. The user experience indicator 130 indicates that the user may have an good user experience even though the radio signal is not as strong as shown in the signal indicator 105 (e.g., the user experience indicator is at the fourth level).

The set of indicators 131 includes a signal indicator 135 and a user experience indicator 140. The signal indicator 135 includes one signal bar (e.g., indicating poor radio signal strength). The three right most signal bars are outlined with dotted lines to indicate that the three right most signal bars are not displayed, because the radio signal from the wireless communication network is not as strong as shown in signal indicators 105, 115 and 125. The user experience indicator 140 indicates that the user may have a poor user experience (e.g., the user experience indicator is at the second level).

The set of indicators 141 includes a signal indicator 145 and a user experience indicator 150. The signal indicator 145 includes five signal bars (e.g., indicating excellent radio signal strength). The user experience indicator 150 indicates that the user may have an excellent user experience (e.g., the user experience indicator is at the fifth level).

The set of indicators 151 includes a signal indicator 155 and a user experience indicator 160. The signal indicator 155 includes zero signal bars (e.g., indicating "no signal"). The four signal bars are outlined with dotted lines to indicate that the four signal bars are not displayed, because no radio signal is received from the wireless communication network. The user experience indicator 160 indicates that the user may not have a user experience (e.g., the user experience indicator is at the first or lowest level) because the user is unable to use the wireless communication network.

In one embodiment, the user experience indicator 110 may be based on a user experience metric which may be obtained (e.g., generated, received, or calculated) by a user device. For example, the level of height of the user experience indicator may be based on a value for the user experience metric (e.g., if the value of a user experience metric is between 75 and 100, on a scale of 100, then the user experience indicator may be at the fifth level). The user experience metric is discussed in more detail below in conjunction with FIGS. 5-9.

In one embodiment, the user experience indicators 110, 120, 130, 140, 150 and 160 may provide users with an intuitive and more accurate indication of their user experience when using a wireless communication network (e.g., when transmitting or receiving data using the wireless communication network). Users may be accustomed to the "signal bars" (e.g., the signal indicators) which are currently displayed by many types of user devices (e.g., smart phones, tablet computers, electronic book readers, etc.) and providing the user experience indicator next to the signal indicators allows users to quickly and accurately determine their user experience when using a wireless communication network.

Although signal bars are illustrated in FIG. 1, in other embodiments, a GUI may include other icons, images, graphics or representations of the signal strength of radio signals received from a wireless communication network. Furthermore, in some embodiments, the user experience indicators may be displayed adjacent to a signal indicator (e.g., displayed above, below, to the right or to the left). In additional embodiments, the user experience indicator may be displayed in any region or location of the GUI or screen of a user device.

In one embodiment, the user device may include one or more visual indicators, such as light emitting diodes (LEDs). The user experience indicator may be displayed using one or more of the visual indicators (e.g., LEDs) on the user device. For example, an LED on the user device may flash green if the user experience metric is above a certain threshold. In another example, an LED on the user device may flash red if the user experience metric is below a certain threshold. In another embodiment, the user device may provide an audible indication (e.g., an audible indicator such as a sound or a voice) of the user experience metric using an audio output device (e.g., a head phone jack, a speaker, etc.). For example, the user device may use a speaker to play one or more "beep" noises, based on the value of the user experience metric. In another example, the user device may play a voice that states a value for the user experience metric. The user device may play a voice that states the words "Good,", "Excellent," "Average," or "Poor," based on the user experience metric. The user device may also play a voice that states a number (e.g., 100, 58, 22) based on the value of the user experience metric. In a further embodiment, the user device may provide a haptic indication (e.g., haptic feedback or tactile feedback) of the user experience metric. For example, the user device may vibrate multiple times in succession if the user experience metric value is over a certain threshold.

FIG. 2 is a diagram illustrating an exemplary graphical user interface (GUI) 200 which may be displayed by a user device (e.g., a smart phone, a tablet computer, an electronic book reader, etc.), according to one embodiment.

In one embodiment, the user device may obtain (e.g., generate, receive, or calculate) a user experience metric for each type of wireless communication network that the user device is able to access. The user device may identify a plurality of user experience factors and may identify a plurality of weights for the user experience factors, based on an application. For example, different applications may have different requirements and the user device may identify user experience factors which are appropriate for the application and may identify the weights for the user experience factors. The user experience factors and their corresponding weights may be used to obtain a user experience metric for each type of wireless communication network that the user device is able to access (e.g., able to communicate with). For example, a user device may be able to communicate with a WiFi network and a cellular network (e.g., an LTE network). The user device may identify a plurality of user experience factors for an application (e.g., for a streaming video application) and may identify the corresponding weights of the user experience factors. The user device may obtain a first user experience metric for the WiFi network and obtain a second user experience network for the cellular network based on the user experience factors and their corresponding weights.

In one embodiment, the user device may obtain a user experience metric for each type of wireless communication network, for multiple applications on a user device. For example, if there are two applications on a user device and two wireless communication networks (e.g., a WiFi network and a cellular network), the user device may obtain two user experience metrics for the first application (e.g., one for the WiFi network and one for the cellular network) and may obtain two user experience metrics for the second application (e.g., one for the WiFi network and one for the cellular network).

As shown in FIG. 2, the GUI 200 includes a list of applications (e.g., Application 1 through Application 4). The list of applications (e.g., Application 1 through Application 4) may be applications that a user may access or that are currently executing on the user device. For example, the GUI 200 may be a program list or a "home screen" for a user device (e.g., a smart phone, a tablet computer, or an electronic book reader). In another example, the GUI 200 may be a task manager (e.g., a GUI for view and controlling applications) for a user device. The applications (e.g., Application 1 through Application 4) are represented by application icons 205, 220, 235 and 250.

The user device may have access to two wireless communication networks, a WiFi communication network (e.g., an 802.11g network) and a cellular communication network (e.g., an LTE network). Two user experience indicators are associated with each application. The hatched user experience indicator (e.g., user experience indicator 210) may be associated with the WiFi a communication network and the filled user experience indicator (e.g., user experience indicators 215) may be associated with the cellular communication network. Application icon 205 (e.g., Application 1) is associated with user experience indicators 210 and 215, application icon 220 (e.g., Application 2) is associated with user experience indicators 225 and 230, application icon 235 (e.g., Application 3) is associated with user experience indicators 240 and 245 and application icon 250 (e.g., Application 4) is associated with user experience indicators 255 and 260.

In one embodiment, the user experience indicators associated with each application indicate the quality of the user experience for the different wireless communication networks if the user uses the application. For example, for Application 1, the user experience indicator 210 indicates that the user will have a better user experience if the user uses the WiFi communication network while using Application 1, because the user experience indicator 210 is larger than the user experience indicator 215 (which is associated with the cellular communication network). In another example, for Application 2, the user experience indicator 230 indicates that the user will have a better user experience if the user uses the cellular communication network while using Application 2, because the user experience indicator 230 is larger than the user experience indicator 225 (which is associated with the WiFi communication network).

In one embodiment, the user experience indicators associated with each type of wireless communication networks may be displayed for some or all of the applications on the user device. In another embodiment, the user device may automatically obtain user experience metrics and display the user experience indicators based on the user experience metrics (e.g., automatically display the user experience indicators when the user access an application menu list). In another embodiment, the user device may not obtain the user experience metrics and may not display the user experience indicators until a user provides user input (e.g., clicks on a button, taps a touch screen, etc.) indicating that the user wants to view the user experience indicators for some or all of the applications.

In one embodiment, the user experience indicators may be different colors (e.g., each color representing one type of wireless communication network). In another embodiment, rather than using bars, the user experience indicators may be numbers, or other text. For example, the GUI may display two numbers (e.g., may display "56/78") to indicate the user experience metric for the two types of wireless communication networks. In other embodiments, the user device may use visual indicators (e.g., different color LEDs or flashing LEDs), audio devices (e.g., noises or voices played from a speaker), or haptic indicators (e.g., one or more vibrations of the user device) to indicate the user experience metric for the two types of wireless communication networks.

In one embodiment, the different user experience indicators associated with each application (e.g., Application 1 through Application 4) may allow a user to quickly and easily determine the wireless communication network which may provide the best user experience when the user uses the application. The user may instruct the user device to use the wireless communication network that provides the best user experience when the user uses the application. For example, the user may instruct the user device (e.g., by providing user input) to use a WiFi network instead of a cellular network, or vice versa.

In one embodiment, the different user experience indicators associated with an application (e.g., indicators 210 and 215 shown in FIG. 2, indicators 310, 310, and 315 shown in FIG. 3) are normalized. For example, each of the user experience indicators may be normalized to a scale of 10, or a scale of 50, etc. This may allow a user to quickly compare the different user experiences indicators to determine which wireless network will provide the best user experience (e.g., which user experience metric has the highest value). In another embodiment, the user experience metrics obtained (e.g., calculated) for each type of wireless network, and associated with an application, may also be normalized. For example, each of the user experience indicators may be normalized to a scale of 20, or a scale of 100, etc.

FIG. 3 is a diagram illustrating an exemplary graphical user interface (GUI) 300 which may be displayed by a user device, according to another embodiment. The GUI 300 may be the GUI for a streaming video application (e.g., an application that allow a user to watch videos that a streamed from a network location, such as a server). The GUI 300 includes user experience indicators 305, 310 and 315. The GUI 300 also includes a video viewing portion 320 that displays the videos streamed by the streaming video application and controls 325 (e.g., play, pause, fast forward, volume, etc.) that allow a user to control the playback of a streaming video.

As shown in FIG. 3, there are three user experience indicators 305, 310 and 315. Each of the user experience indicators user experience indicators 305, 310 and 315 are associated with a different type of wireless communication network. For example, the user device may have access to (e.g., may be able to communicate with) a WiFi network, a first cellular network (e.g., a CDMA network) and a second cellular network (e.g., an LTE network). The user experience indicator 305 may be indicative of the quality of user's experience (e.g., conditions, factors, impressions, observations, and/or perceptions that the user may have or may experience) if the user uses the WiFi network to watch streaming videos. The user experience indicator 310 may be indicative of the quality of user's experience if the user uses the first cellular network to watch streaming videos. The user experience indicator 315 may be indicative of the quality of user's experience if the user uses the second cellular network to watch streaming videos.

Note that some embodiments of the present disclosure are described with reference to wireless communication networks. However, embodiments of the present disclosure also apply wired communication networks. For example, embodiments of the present disclosure may apply to Ethernet networks (e.g., a network using a 10BASE-T cabling, 100BASE-T cabling or gigabit Ethernet cabling), or any other type of network which uses physical cabling, rather than wireless radio signals. A user device may also determine a user experience metric and display a user experience indicator for a wired communication network. For example, one of user experience indicators shown in FIGS. 2 and 3 (e.g., user experience indicators 210, 305, etc.) may be associated with a wired communication network.

In one embodiment, a user device may determine that a wired communication network may have a higher user experience metric than other available wireless communication networks. For example, a wired communication network may not be subject to interference from radio signals which may affect radio signal strength in wireless communication networks, may be more secure because data is not broadcasted to other user devices in range, may use less battery power, etc. In another embodiment, the user device may determine that a wired communication network may have a lower user experience than an available wireless communication network. For example, the latency to send data using the wired communication network may be longer than the latency to send data using a wireless communication network (e.g., due to the path or "hops" the data may travel through).

Figure 4:
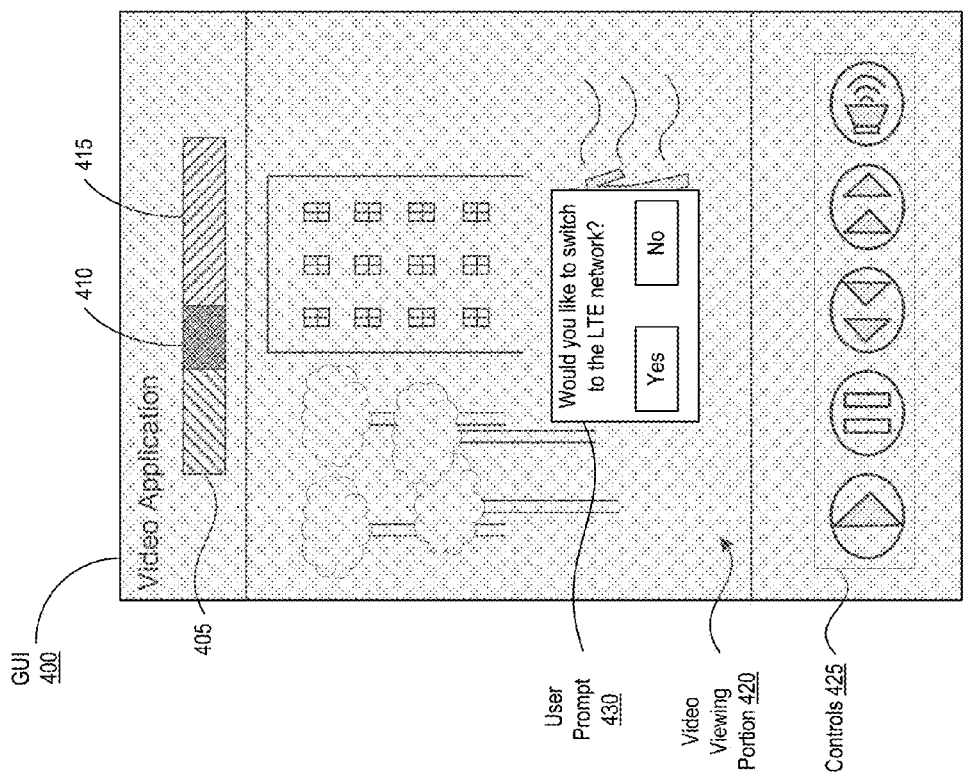
FIG. 4 is a diagram illustrating an exemplary graphical user interface (GUI) which may be displayed by a user device, according to a further embodiment

FIG. 4 is a diagram illustrating an exemplary graphical user interface (GUI) 400 which may be displayed by a user device, according to a further embodiment. Similar to FIG. 3, the GUI 400 may be the GUI for a streaming video application (e.g., an application that allows a user to watch videos that are streamed from a network location, such as a server). The GUI 400 includes user experience indicators 405, 410 and 415, a video viewing portion 420 and controls 425. Each of the user experience indicators user experience indicators 405, 410 and 415 are associated with a different type of wireless communication network. The user experience indicator 405 may be indicative of the quality of user's experience if the user uses the WiFi network to watch streaming videos. The user experience indicator 410 may be indicative of the quality of user's experience (e.g., conditions, factors, impressions, observations, and/or perceptions that the user may have or may experience) if the user uses the first cellular network (e.g., a CDMA network) to watch streaming videos. The user experience indicator 415 may be indicative of the quality of user's experience if the user uses the second cellular network (e.g., an LTE network) to watch streaming videos.

The GUI 400 also includes a user prompt 430. As discussed above, the user device may identify the wireless communication network which provides the best user experience when the user uses an application. The user device may be currently using a WiFi network which may provide a lower quality of user experience than the second cellular network (e.g., the LTE network). The user device may provide the user prompt 430 to the user via the GUI 400, to determine whether the user wants to use the communication network which provides the best user experience (e.g., the LTE network). The user may provide user input (e.g., click the "Yes" button or click the "No" button) to indicate whether the user device should switch to the wireless communication network which provides the best user experience. In one embodiment, the user device may automatically determine the wireless communication network which provides the best user experience and may automatically configure the user device to use that wireless communication network, rather than prompting the user for input. In another embodiment, the user device may provide a list of available wireless communication networks and may allow a user to choose one of the wireless communication networks from the list.

Figure 5:
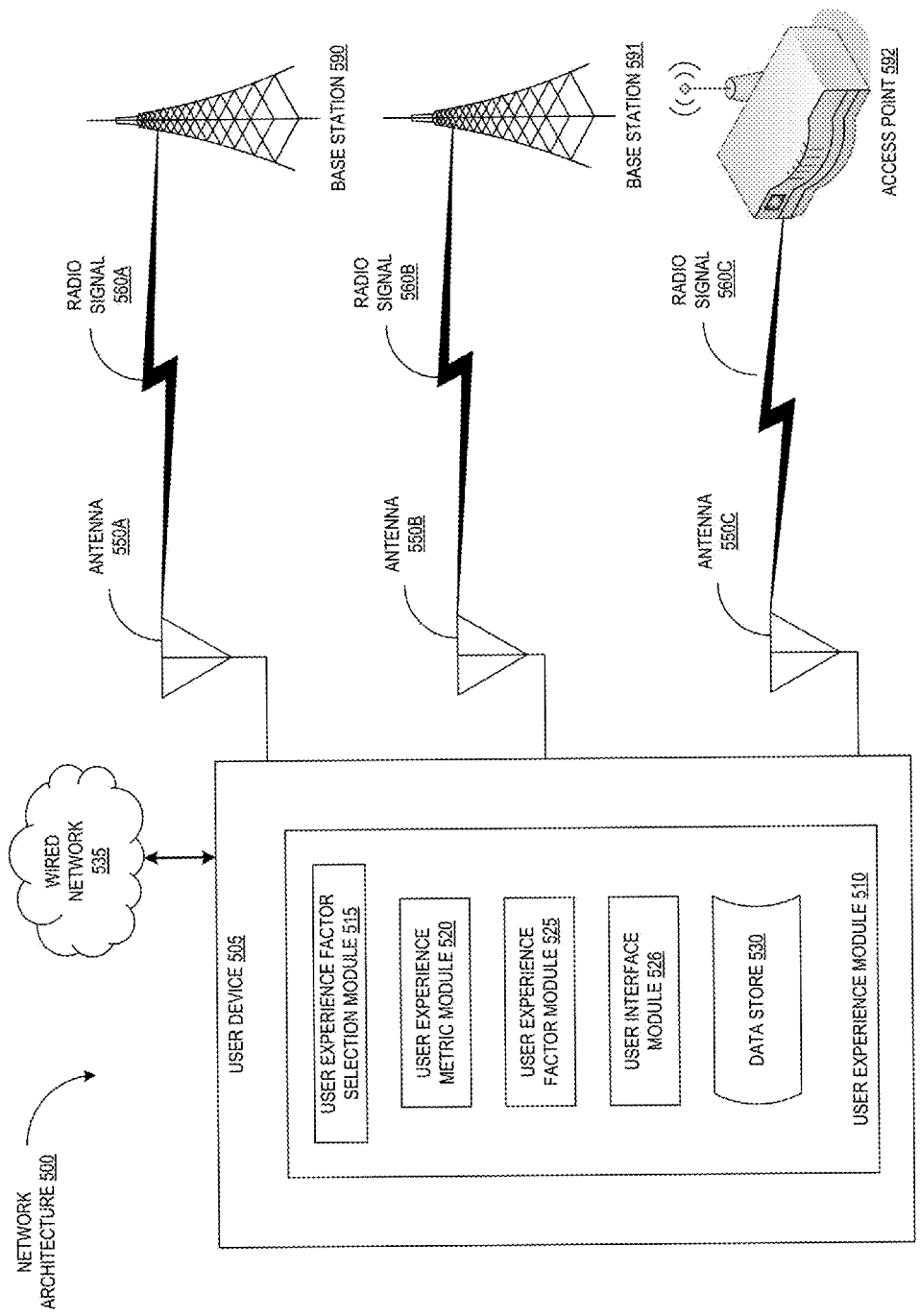
FIG. 5 is a block diagram of a first exemplary network architecture, in which embodiments of the present invention may operate.

FIG. 5 is a block diagram of a first exemplary network architecture 500, in which embodiments of the present invention may operate. The network architecture 500 includes a user device 505, a wired network 535, a base station 590, a base station 591 and an access point 592. The user device 505 includes a user experience module 510. The user experience module 510 includes a user experience factor selection module 515, a user experience metric module 520, a user experience factor module 525, a user interface module 526 and a data store 530. The user device 505 also includes a plurality of antennas 550A, 550B and 550C. Antenna 550A receives radio signal 560A transmitted by base station 590. Antenna 550B receives radio signal 560B transmitted by base station 591. Antenna 550C receives radio signal 560C transmitted by access point 592. The base station 590 may be part of a first cellular communication network (e.g., an LTE network), the base station 591 may be part of a second cellular communication network (e.g., a CDMA network) and the access point 592 may be part of a WiFi network (e.g., an 802.11n or an 802.11g network).

In one embodiment, the user device (e.g., applications within the user device) may use the base station 590, the base station 591, or the access point 591 to transmit and receive data. For example, an online banking application may access a user's bank account using the base station 590, an electronic book application may download a digital media item (e.g., an electronic book) from a server using the base station 591 and a streaming video application may stream videos from a server using the access point 592. In another embodiment, the user device 505 may use the wired network 535 (e.g., a local area network, an Ethernet network) to transmit and receive data. For example, the user device 505 may include a network interface device (e.g., an Ethernet network card) that may be coupled to the wired network 535. The user device 505 may transmit and receive data from the wired network 535 using the network interface device.

In one embodiment, the user experience module 510 may obtain a user experience metric for a wireless communication network or a wired network (e.g., wired network 535). The user experience module may determine the quality of a user experience when a user uses the wireless communication network based on a plurality of user experience factors and weights associated with the user experience factors. The user experience module 510 may display a user experience indicator, based on the user experience metric for the wireless communication network. In another embodiment, the user experience module 510 may obtain a user experience metric for each type of wireless communication network and the wired network 535 (e.g., Ethernet network) that the user device 505 is able to communicate with, based on an application within the user device 505. For example, the user experience module 510 may obtain three user experience metrics, one for the first cellular communication network, one for the second cellular communication network and one for the WiFi network. The user experience metrics may be based on user experience factors (that are identified based on the application) and based on weights associated with the user experience factors. The user experience module 510 may obtain three user experience metrics for multiple applications within the user device 505. In a further embodiment, the user experience module 510 may display user experience indicators to a user, may prompt the user for input and may select one of the wireless communication networks based on the user input (e.g., may configure the user device to use the selected wireless communication network).

In one embodiment, the data store 530 may store data indicative of user experience factors and weights for (e.g., associated with) the user experience factors. Exemplary user experience factors may include, but are not limited to, the type of a wireless communication network (e.g., whether it is an LTE, HSPA+, CDMA, or WiFi network), a maximum data rate required by an application, a minimum data rate required by an application, whether other applications are currently using a wireless communication network, a mobility state of the user device 505 (e.g., how fast the user device 505 is moving), a security requirement for an application, a battery level of the user device 505, a communication state of the user device 505, a time of day, a signal strength of a wireless communication network (e.g., measurements indicative of signal conditions of the wireless communication network such as received signal code power (RSCP), received signal strength indicator (RSSI), reference signal receive power (RSRP), reference signal receive quality (RSRQ), Ec/No (RSCP divided by RSSI), channel quality indicator (CQI) reports, rank indicator reports, etc.), whether the user device 505 supports MIMO, an error rate for data transmitted or received by the user device 505, the length of data queues in the user device 505 (e.g., data queues for different communication layers of the user device, such as Packet Data Convergence Protocol (PDCP) queues, radio link control (RLC) queues, medium access control (MAC) queues, etc.), data retransmission rates, etc.

The type of the wireless communication network may affect the user's experience because some types of wireless communication networks may provide higher throughput (e.g., may be faster) than other types of wireless communication networks (e.g., an LTE network may be faster than a CDMA network or and 802.11b network). Types of wireless communication networks having a higher throughput may be assigned a higher user experience factor value (e.g., an LTE network may be assigned a value of 10 while an 802.11b network may be assigned a value of 5). The maximum or minimum data rate required for an application may affect the user's experience because if a wireless communication network cannot provide the minimum data rate required for the application, the application may not operate correctly or efficiently. If a wireless communication network can provide the minimum or maximum data rate (e.g., minimum or maximum throughput), the user experience factor value for the wireless communication network may be higher. The number of other applications using a wireless communication network affects the user's experience because if other applications are using a wireless communication network, then later applications which also use the wireless communication network may have lower data throughput (e.g., because other applications are using some of the available data throughput). This user experience factor may be assigned a higher value if there are few or not applications using the wireless communication network (e.g., a value of 10 if there are no applications using the network and a value of 4 if there are three applications using the network).

The mobility state of the user device 505 may affect also the user's experience. If the user device 505 is travelling at a high speed (e.g., the user device 505 is in a car), then this may cause the user device 505 to handoff between cell towers and the handoffs may affect the throughput or latency of data transmitted or received from the user device 505. Based on the mobility speed of the user device, wireless communication networks which have a larger coverage area (e.g., cell towers which a larger radius) may be assigned a higher value (e.g., a CDMA cell tower may have a larger coverage area than an LTE cell tower, so the CDMA network may be assigned a value of 8 and the LTE network may be assigned a value of 5, even though the LTE network may provide higher throughput). The security requirement of an application may also affect a user's experience because the quality of the user's experience may decrease if sensitive data of the user is compromised. A wireless communication network may be assigned a higher value if the wireless communication network provides better encryption or security (e.g., an LTE network may be given a higher value than a public WiFi network).

The battery level of the user device may affect a user's experience because the quality of the user's experience may decrease if the user device uses battery power faster (e.g., runs out of battery power faster). Wireless communication networks which cause the user device to use more power may be assigned a lower value when the battery level of the user device is below a certain threshold. For example, if battery is below 50%, then an LTE network may be assigned a value of 4 and a WiFi network may be assigned a value of 9 because the communicating with the LTE network will cause the user device to use more power. The communication state of the user device may also affect the user's experience. The communication state of the user device affects the amount of time for a user device to transmit or receive data. For example, if the user device is already communicating with the wireless communication network (e.g., the user device has a dedicated communication channel), then data may be downloaded by an application more quickly (e.g., a web browser may immediately start loading a web page). However, if the user device is currently not communicating with a wireless communication network (e.g., the user device is in an idle state), then it may take time for the user device to setup the communication channel, which increases the amount of time it takes for a user device to transmit or receive data. In a further example, if the user device is in an intermediate communication state (e.g., in CELL_FACH or CELL_PCH state) it may be faster for the user device to start transmitting or receiving data than if the user device was idle, but slower than if the user device already had a dedicated channel. A wireless communication network may be assigned a higher value if the user device is in a connected state (e.g., has a dedicated channel) with the wireless communication network than if the user device is in an idle state (e.g., has no communication channel).

The location of the user device 505 may affect the user's experience if the user device 505 is located in a congested area (e.g., located in an area where many different user devices are using a wireless communication network). A wireless communication network may be assigned a higher value if the user device is located in an area that is less congested. The time of day may also affect the user's experience because there may be few user devices using the wireless communication network at certain times. For example, fewer user devices may use a wireless communication network during the early mornings or late evenings. A wireless communication network may be assigned higher value if the time of day is during a time when fewer users are using the wireless communication network.

The signal strength of radio signals transmitted by a wireless communication network may affect a user's experience. For example, if a user device detects a stronger radio signal from a wireless communication network, the user device may be able obtain a higher data throughput using the wireless communication network. A wireless communication network may be assigned a higher value if the strength of the radio signal from the wireless communication network is stronger (e.g., has a higher RSCP value, has a higher RSSI value, etc.). The amount of data in the data queues of the user device may also affect the user's experience. For example, the more data a user device has in its data queues (e.g., MAC data queues, Transmission Control Protocol (TCP) windows or data queues, etc.), the longer it will take a device to transmit additional data, because the user device has to transmit the data currently in the data queues. This user experience factor may be assigned a higher value if there is less data in the data queues and a lower value if there is more data in the data queues.

The error rate of data transmitted or received by the user device may also affect a user's experience. For example, if there are errors in a block of data, the user device may need to re-download the block of data. In another example, if there is error in the data downloaded for a streaming video, the user may not be able to view a segment of the streaming video. If data transmitted or received from a wireless communication network has a low error rate, the value assigned to the wireless communication network may be higher. The re-transmission rate of data may also affect a user's experience. For example, if a user device is re-transmitting data because of errors in the data, this may lower the data throughput of the user device. If there are fewer data re-transmissions for a wireless communication network the value assigned to the wireless communication network may be higher.

The cost of using a wireless communication network may also affect the user's experience. For example, a user may have a data limit (e.g., 2 gigabytes a month, 5 gigabytes a month, etc.) for transmitting and receiving data on a cellular network but the user may not have any data limits on a WiFi network. This user factor may be assigned a lower value if the user is close to the data limit for a wireless communication network.

The temperature of the user device 505 may also affect the user's experience. For example, transmitting and receiving data on a cellular network may increase the temperature of the user device 505 more than transmitting and receiving data on a WiFi network. This user factor may be assigned a lower value if the type of the wireless network may cause an increase in the temperature (e.g., the operating temperature) of the user device 505.

The proximity of the user device 505 to the user may also affect the user's experience. The closer the user device 505 is to the user, the more the user may be subjected to radio signals (e.g., radiation) from the user device. In addition, some types of networks may cause the user device 505 to transmit stronger radio signals (e.g., emit more radiation). For example, cellular radio signals may be stronger than WiFi radio signals. This user factor may be assigned a lower value if the user device 505 is closer to the user and may be assigned a higher value if the user device 505 is further away from the user. This user factor may also be assigned a lower value of the type of the wireless network uses stronger radio signals.

In one embodiment, a user experience factor may be any setting, parameter, data, requirement, preference, measurement, characteristic of a user device (e.g., temperature, proximity to a user), characteristic of a wireless communication network, or any other information which may affect a user's experience (e.g., affects the speed, throughput, security, cost, etc.) when the user uses a wireless communication network (e.g., when the user uses an application that uses the wireless communication network).

In one embodiment, the data store 530 may also store data indicative of weights associated with the user experience factors. The weights for each user experience factor may change based on requirements or preferences of an application or preferences of a user. For example, if an application prefers a secure connection, then that the user experience factor (e.g., the security factor) may be assigned a higher weight. In another example, the user may indicate that high throughput is important to the user (e.g., by setting a parameter on the user device). The throughput of a wireless communication network (e.g., the throughput user experience factor) may be assigned a higher weight.

In one embodiment, the user experience factor selection module 515 may analyze one or more applications to identify requirements or preferences for the applications. For example, an online banking application may prefer a more secure connection when communicating with a server using a wireless communication network. In another example, a video streaming application may prefer a higher throughput connection when streaming videos using a wireless communication network. In a further example, a video game application may prefer low latency when playing an online game using a wireless communication network. Based on the requirements or preferences of an application, the user experience factor selection module 515 may identify a plurality of user experience factors. For example, if an application prefers or requires a secure connection, the user experience factor selection module 515 may select the security user experience factor as one of the plurality of user experience factors to use when obtaining a user experience metric.

In another embodiment, the user experience factor selection module 515 may identify a plurality of user experience factors based on user preferences, user settings, or other settings and preferences (e.g., based on preferences provided by a cellular service provider). For example, if a user indicates that battery power usage is important to the user, the user experience factor selection module 515 may select the battery power user experience factor as one of the plurality of user experience factors when obtaining a user experience metric. In another example, a cellular service provider may indicate that a user device should use WiFi networks whenever possible (e.g., the service provider sets the preference when the service provider sells the user device to a user). Based on the parameter or preference, the user experience factor selection module 515 may include the network type user experience factor as one of the plurality of user experience factors used to obtain a user experience metric.

In one embodiment, the user experience factor module 525 may obtain values for the user experience factors identified or selected by the user experience factor selection module 515. For example, the user experience factor module 525 may determine the current battery level and assign the battery level factor a certain value, based on the current battery level. In another example, the user experience factor module 525 may detect the signal strength for a wireless communication network and may assign a value for the signal strength factor based on the detected signal strength. The user experience factor module 525 may also assign values to user experience factors based on user preferences. For example, a user may indicate that the user prefers to use WiFi networks whenever possible (e.g., in order to reduce cellular data plan costs) and the type of the wireless communication network (e.g., the network type user experience factor may assigned a higher value) for the network type factor when determining a user experience metric for a WiFi network.

In one embodiment, the user experience metric module 520 may obtain (e.g., calculate) a user experience metric for each type of wireless communication network. The user experience metric module 520 may also obtain user experience metrics associated with different wireless communication networks, for multiple applications. For example, if a user devices is able to access three types of wireless communication networks and the user device has two applications within the user device, the user experience metric module 520 may obtain a first set of three user experience metrics for the first application and may obtain a second set of three user experience metrics for the second application.

In one embodiment, the user experience metric module 520 may use the values for user experience factors identified or assigned by the user experience factor module 525. The user experience metric module 520 may also use weights associated with the user experience factors (which may be stored in the data store 530). In one embodiment, if there are "X" number of user experience factors, the user experience metric module 520 may determine or calculate a user experience metric as follows: (Factor 1*Weight 1)+(Factor 2*Weight 2)+ . . . +(Factor X*Weight X). In other embodiments, the user experience metric may be calculated using different types of methods, formulas or equations. For example, a polynomial or exponential formula using the values for the user experience factors and the weights associated with user experience factors, may be used to calculate the user experience metric.

FIGS. 6-9 are flow diagrams illustrating methods for determining user experience metrics. For simplicity of explanation, the methods are depicted and described as a series of acts. However, acts in accordance with this disclosure can occur in various orders and/or concurrently and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

Figure 6:
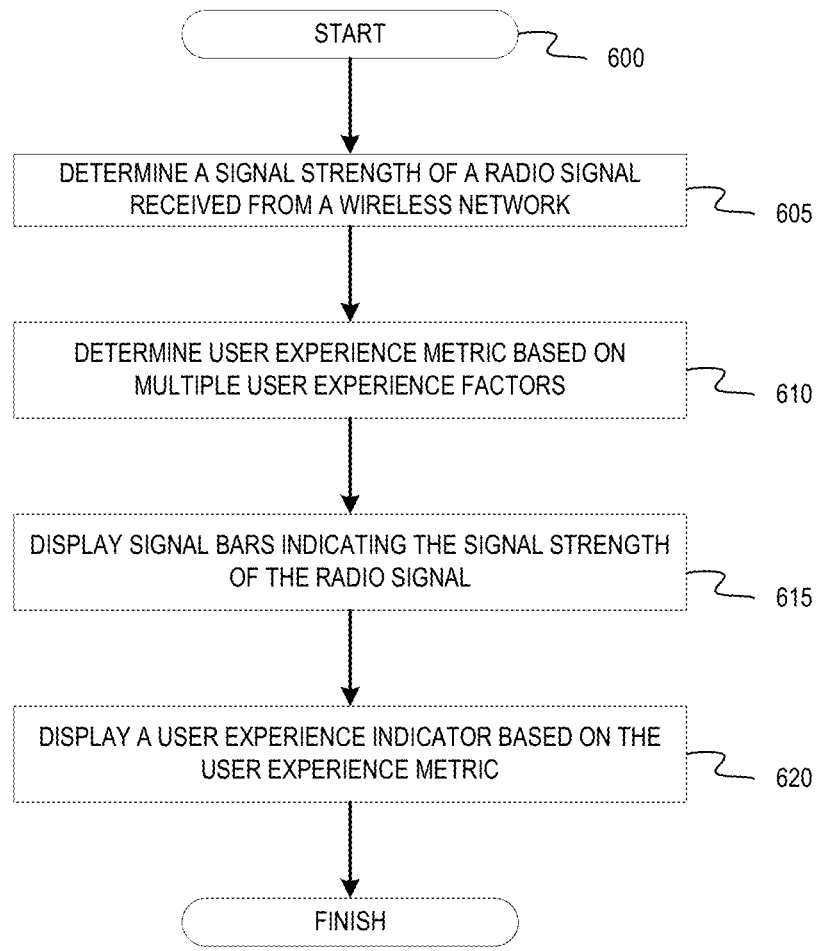
FIG. 6 is a flow diagram illustrating a method of determining a user experience metric, according to an embodiment.

FIG. 6 is a flow diagram 600 illustrating a method of determining a user experience metric, according to an embodiment. The method 600 may be performed by processing logic that comprises hardware (e.g., circuitry, dedicated logic, programmable logic, microcode, etc.), software (e.g., instructions run on a processor to perform hardware simulation), or a combination thereof. The processing logic is configured to determine or calculate a user experience metric and display data indicative of the user experience metric. In one embodiment, method 600 may be performed by a user experience module, as shown in FIG. 5.

Referring to FIG. 6, at block 605, the method 600 determines a signal strength of a radio signal (e.g., a wireless signal) received from a wireless network (e.g., from a WiFi network or from a cellular network, such as an LTE network). At block 610, the method 600 determines a user experience metric based on multiple user experience factors. For example, the method 600 may identify a set of user experience factors based on application or user preferences. The method 600 may determine values for each of the user experience factors and may determine a weight for each of the user experiences factors. The method 600 may calculate or obtain a user experience metric based on the values for the user experience factors and the weights for the user experience factors. At block 615, the method 600 displays signal bars (e.g., display data indicative of the signal strength) indicating the signal strength of the radio signal. At block 620, the method 600 displays a user experience indicator (e.g., a bar, a numerical value) based on the user experience metric.

In one embodiment, the method 600 may be performed periodically. For example, the method 600 may be performed once per minute, once every 10 minutes, once per hour, etc. Performing the method 600 periodically may allow a user device to update the user experience indicator to reflect any changes in the user experience factors (e.g., may allow the user device to periodically refresh the user experience indicator).

Figure 7:
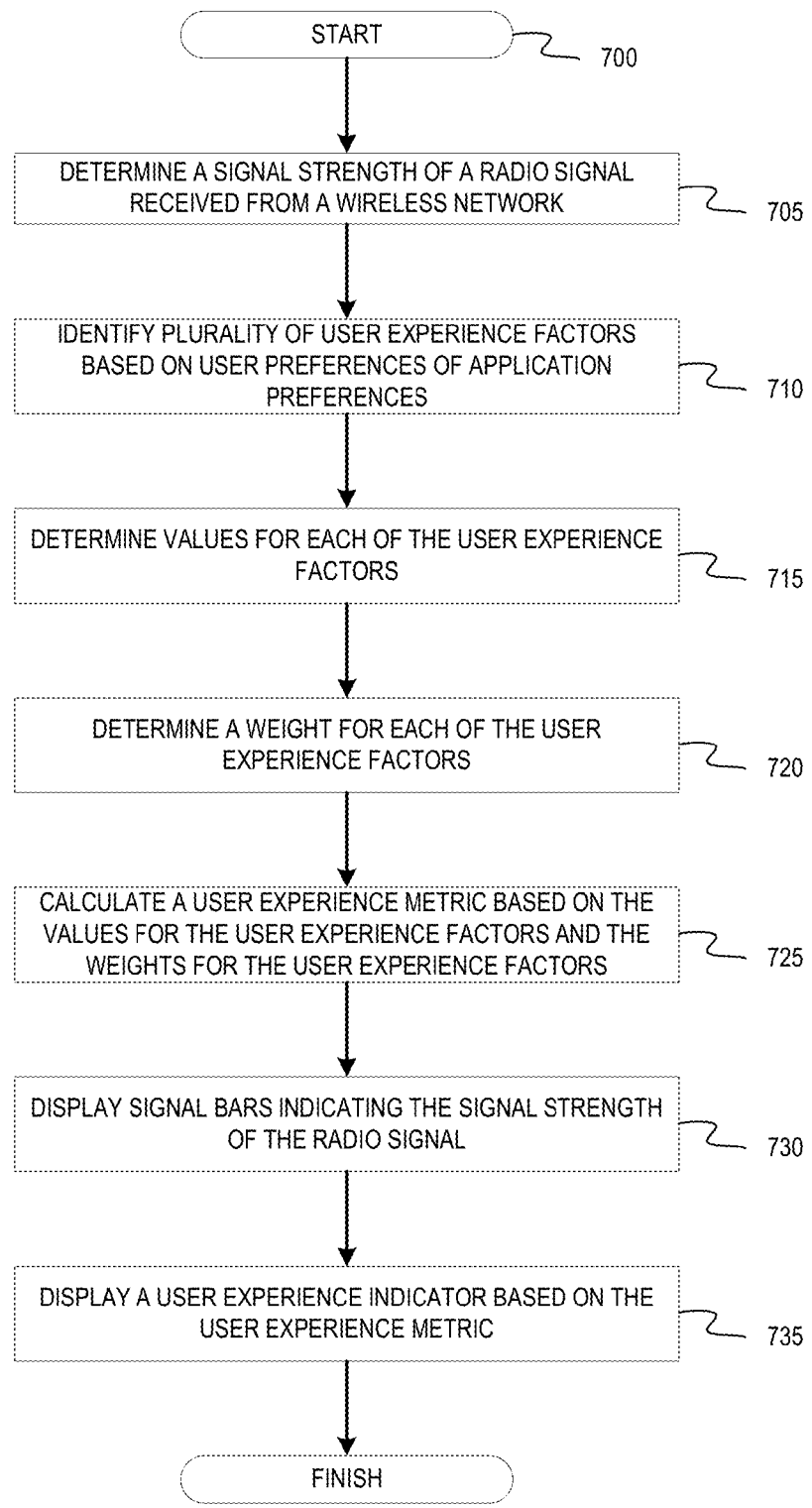
FIG. 7 is a flow diagram illustrating a method of determining a user experience metric, according to another embodiment.

FIG. 7 is a flow diagram illustrating a method 700 of determining a user experience metric, according to another embodiment. The method 700 may be performed by processing logic that comprises hardware (e.g., circuitry, dedicated logic, programmable logic, microcode, etc.), software (e.g., instructions run on a processor to perform hardware simulation), or a combination thereof. The processing logic is configured to determine or calculate a user experience metric and display data indicative of the user experience metric. In one embodiment, method 700 may be performed by a user experience module, as shown in FIG. 5.

Referring to FIG. 7, at block 705, the method 700 determines a signal strength of a radio signal received from a wireless network. At block 710, the method 700 identifies a plurality of user experience factors based on one or more user preferences or application preferences. For example, the method 700 may select the security factor if an application prefers secure connections. At block 715, the method 700 may determine a value for each of the user experience factors. At block 720, the method 700 determines a weight for each of the user experience factors. At block 725, the method 700 calculates a user experience metric based on the values for the user experience factors and the weights of the user experience factors. For example, the method 700 may multiply the value of each user experience factor with a corresponding weight and may add each of the multiple values to obtain the user experience metric. At block 730, the method 700 may display signal bars indicating the signal strength of the radio signal. At block 735, the method 700 may display a user experience indicator based on the user experience metric.

In one embodiment, the method 700 may be performed periodically. For example, the method 700 may be performed once every 30 seconds, once every 5 minutes, once every 2 hours, etc. Performing the method 700 periodically may allow a user device to update the user experience indicator to reflect any changes in the user experience factors (e.g., may allow the user device to periodically refresh the user experience indicator).

Figure 8:
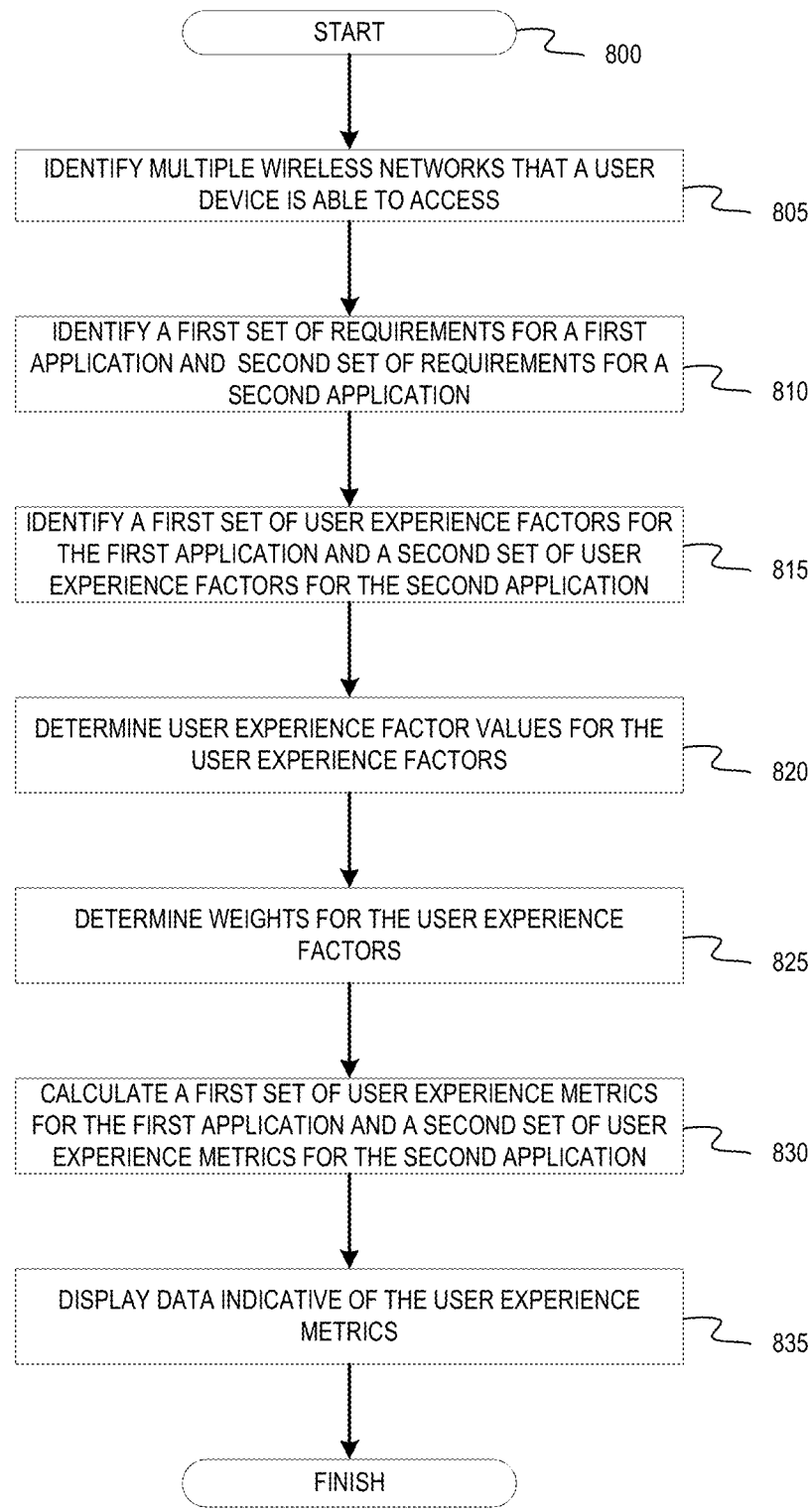
FIG. 8 is a flow diagram illustrating a method of determining user experience metrics, according to one embodiment.

FIG. 8 is a flow diagram illustrating a method 800 of determining user experience metrics, according to one embodiment. The method 800 may be performed by processing logic that comprises hardware (e.g., circuitry, dedicated logic, programmable logic, microcode, etc.), software (e.g., instructions run on a processor to perform hardware simulation), or a combination thereof. The processing logic is configured to determine or calculate multiple sets of user experience metrics. Each set of user experience metrics may be associated with an application and each user experience metric within a set of user experience metrics may be associated with a type of wireless communication network. In one embodiment, method 800 may be performed by a user experience module, as shown in FIG. 5.

Referring to FIG. 8, at block 805, the method 800 identifies multiple wireless networks that a user device is able to access (e.g., wireless networks from which a user device can receive a radio signal). At block 810, the method 800 identifies a first set of requirements or preferences for a first application (e.g., a security requirement or preference, a throughput requirement or preference) and identifies a second set of requirements or preferences for a second application. At block 815, the method 800 identifies a first set of user experience factors for the first application, based on the first set of requirements or preferences and identifies a second set of user experience factors for the second application, based on the second set of requirements or preferences. At block 820, the method 800 determines user experience factor values for each user experience factor in the first set of user experience factors and the second set of user experience factors. At block 825, the method 800 determines a weight for each user experience factor in the first set of user experience factors and the second set of user experience factors. At block 830, the method 800 calculates a first set of user experience metrics for the first application and a second set of user experience metrics for the second application. At block 835, the method 800 displays data indicative of the user experience values (e.g., as shown by indicators 210, 215, 225, 230, etc., in FIG. 2).

In one embodiment, the method 800 may be performed periodically. For example, the method 800 may be performed once every 2 minutes, once every 30 minutes, once every hour, etc. Performing the method 800 periodically may allow a user device to update the user experience indicators to reflect any changes in the user experience factors (e.g., may allow the user device to periodically refresh the user experience indicators).

Figure 9:
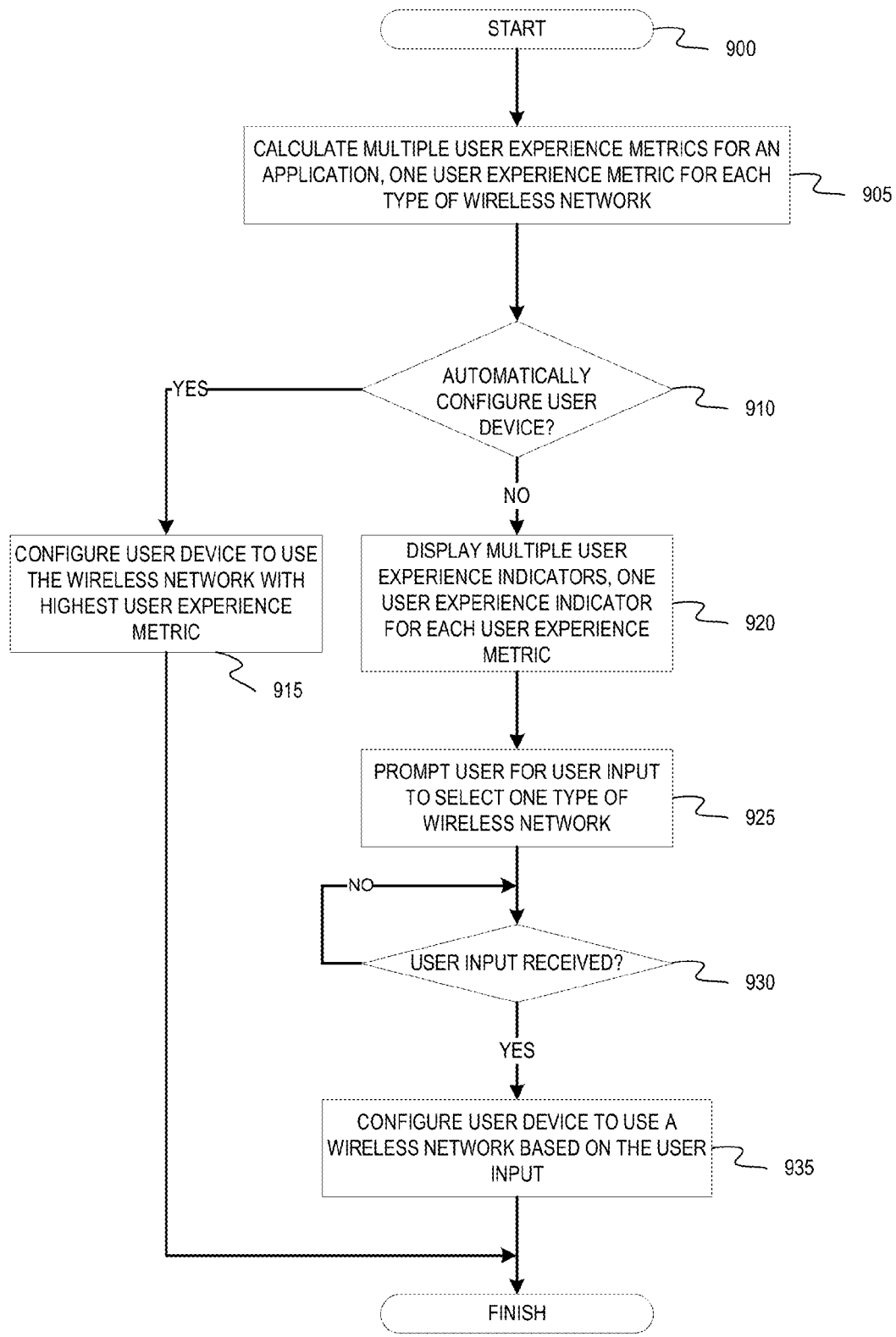
FIG. 9 is a flow diagram illustrating a method of determining user experience metrics, according to another embodiment.

FIG. 9 is a flow diagram illustrating a method 900 of determining user experience metrics, according to another embodiment. The method 900 may be performed by processing logic that comprises hardware (e.g., circuitry, dedicated logic, programmable logic, microcode, etc.), software (e.g., instructions run on a processor to perform hardware simulation), or a combination thereof. The processing logic is configured to determine or calculate multiple sets of user experience metrics. Each set of user experience metrics may be associated with an application and each user experience metric within a set of user experience metrics may be associated with a type of wireless communication network. In one embodiment, method 900 may be performed by a user experience module, as shown in FIG. 5. In another embodiment, the method 900 may be performed after the method 800 of FIG. 8 is performed.

Referring to FIG. 9, at block 905, the method 900 calculates multiple user experience metrics for an application. Each user experience metric is associated with one type of wireless network (e.g., one user experience metric for WiFi network, another user experience metric for an LTE network). At block 910 the method determines whether it should automatically configure the user device to user the best wireless network (e.g., the wireless network that has the highest user experience metric). For example, the user device may have a parameter or setting indicating that the user device should automatically use the wireless network with the highest user experience metric, or indicating that the user device should prompt the user for input to select a wireless network. If the user device should automatically configure the user device, the method 900 configures the user device to use the wireless network with the highest user experience metric at block 915. If the user device should not automatically configure the user device, the method 900 moves to block 920, where the method 900 display multiple user experience indicators (e.g., indicators 305, 310 and 315, as shown in FIG. 3).

At block 925, the method 900 may prompt the user for user input to select one of the multiple types of wireless networks (e.g., prompt 430 as shown in FIG. 4). For example, the method 900 may display a list of wireless networks and prompt the user for user input selecting one wireless network from the list. In another example, the method 900 select the wireless network with the highest user experience metric and may prompt the user to indicate whether the user wishes to use that wireless network. At block 930, the method 900 determines whether user input has been received. If no user input has been received, the method 900 loops back to block 930. If user input is received, the method moves to block 935, where the method configures the user device to use a wireless network based on the user input (e.g., to use a wireless network selected by the user).

In one embodiment, the method 900 may be performed periodically. For example, the method 900 may be performed once every 2 minutes, once every 30 minutes, once every hour, etc. Performing the method 900 periodically may allow a user device to indicate to a user that a different type of wireless network should be used based on changes in the user experience factors.

Figure 10:
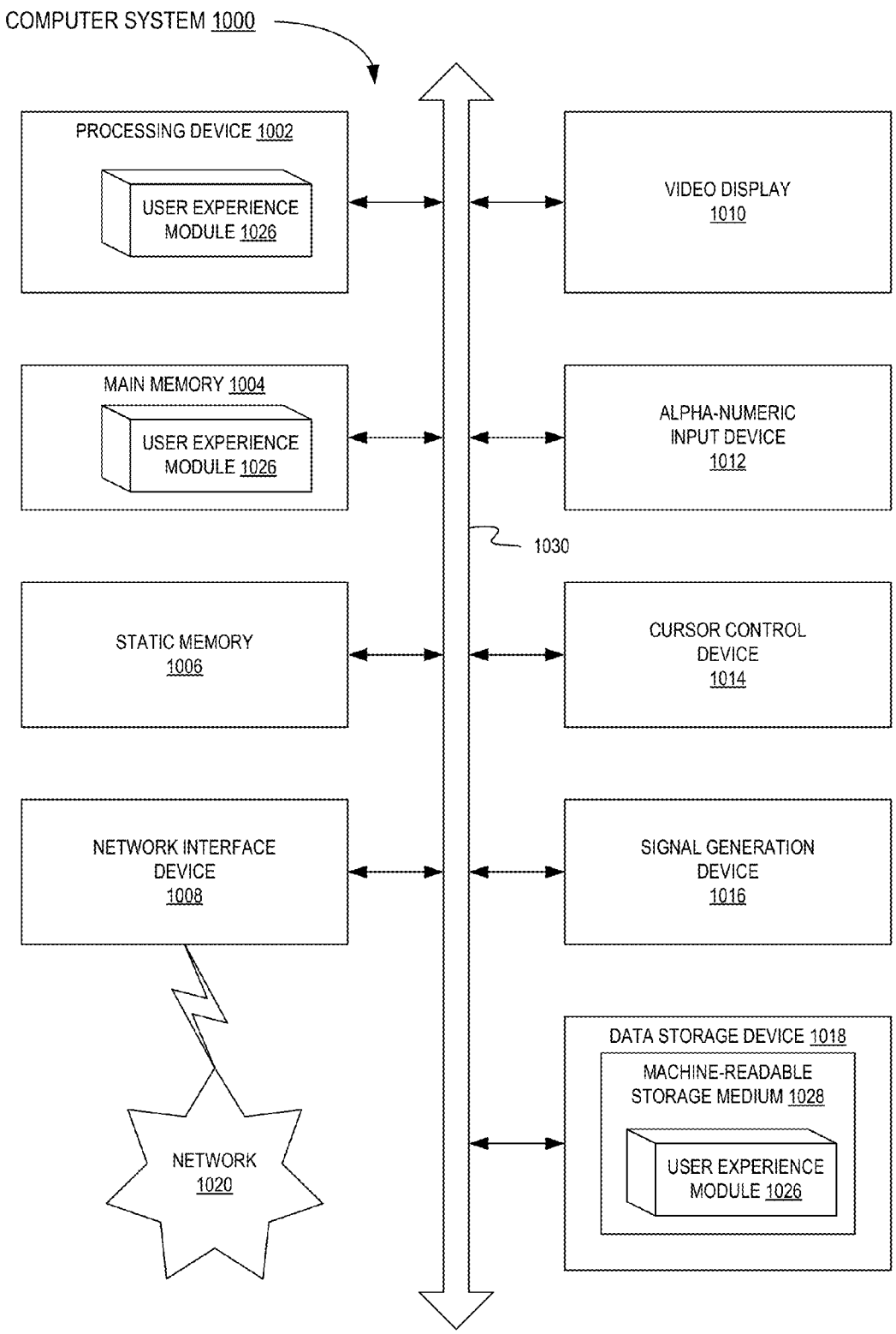
FIG. 10 is a block diagram illustrating one embodiment of a computer system, according to an embodiment.

FIG. 10 illustrates a diagrammatic representation of a machine in the exemplary form of a computer system 1000 within which a set of instructions, for causing the machine to perform any one or more of the methodologies discussed herein, may be executed. The system 1000 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1000 includes a processing device (e.g., a processor) 1002, a main memory 1004 (e.g., read-only memory (ROM), flash memory, dynamic random access memory (DRAM) such as synchronous DRAM (SDRAM)), a static memory 1006 (e.g., flash memory, static random access memory (SRAM)) and a data storage device 1018, which communicate with each other via a bus 1030.

Processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also be one or more special-purpose processing devices such as an application specific integrated circuit (ASIC), a field programmable gate array (FPGA), a digital signal processor (DSP), network processor, or the like. The processing device 1002 is configured to execute the user experience module 1026 for performing the operations and steps discussed herein.

The computer system 1000 may further include a network interface device 1008 which may communicate with a network 1020. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and a signal generation device 1016 (e.g., a speaker).

The data storage device 1018 may include a computer-readable medium 1028 on which is stored one or more sets of instructions (e.g., instructions of user experience module 1026) embodying any one or more of the methodologies or functions described herein. The user experience module 1026 may also reside, completely or at least partially, within the main memory 1004 and/or within the processing device 1002 during execution thereof by the computer system 1000, the main memory 1004 and the processing device 1002 also constituting computer-readable media. The instructions may further be transmitted or received over a network 1020 via the network interface device 1008.

While the computer-readable storage medium 1028 is shown in an exemplary embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

The term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media and magnetic media.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "determining," "calculating," "transmitting," "receiving," "multiplying," "configuring," "reconfiguring," "displaying," "obtaining," "prompting," "communicating," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The above description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   determining, by at least one processor, a signal strength for a wireless signal associated with a first wireless communication network;
   identifying, by the at least one processor, a plurality of factors that contribute to an user experience;
   identifying, by the at least one processor, a weight stored in a memory;
   identifying, by the at least one processor, a corresponding first factor of the plurality of factors;
   determining, by the at least one processor, a first set of measurements corresponding to the first factor, wherein the first set of measurements pertains to the user experience in connection with the first wireless communication network;
   determining, by the at least one processor, a first user experience indicator for the first wireless communication network based at least in part on the first set of measurements weighted according to the weight;
   determining, by the at least one processor, a second set of measurements corresponding to the first factor, wherein the second set of measurements pertains to the user experience in connection with a second wireless communication network;
   determining, by the at least one processor, a second user experience indicator for the second wireless communication network based at least in part on the second set of measurements weighted according to the weight;
   displaying, by a display device, the first user experience indicator to indicate the user experience with the first wireless communication network;
   displaying, by the display device, the second user experience indicator to indicate the second user experience in connection with the second wireless communication network;
   displaying a signal strength indicator to indicate the signal strength for the wireless signal, wherein:
   the signal strength indicator is based on the signal strength and a type of the first wireless communications network,
   the signal strength indicator is displayed in a same banner area as the first user experience indicator and the second user experience indicator, and
   the plurality of factors are different than the signal strength and the type of the first wireless communications network;
   displaying, by the display device, a prompt for a selection of the first wireless communication network or the second wireless communication network; and
   selecting, based at least in part on an input associated with the prompt, the first wireless communication network.

2. The method of claim 1, wherein:
   the first user experience indicator and the second user experience indicator are combined into a single indicator, and
   the single indicator comprises at least one of a bar displayed on a screen of a user device, a numerical value, a light emitted from an LED, an audible indicator, a haptic indicator, or text.

3. The method of claim 1, wherein the plurality of factors comprise two or more of:
   a time of day;
   a power level of a user device;
   a location of the user device;
   a temperature of the user device;
   a proximity of the user device to the user;
   a cost associated with the first wireless communication network or the second wireless communication network;
   a communication state of the user device;
   a security preference;
   one or more preferences of an application on the user device;
   a queue length of the user device; or
   an error rate of data transmitted or received by the user device.

4. The method of claim 1, wherein the plurality of factors are identified based on one or more preferences of an application that is using the first wireless communication network.

5. A system comprising:
   an antenna configured to receive a wireless signal from wireless communication networks; and a processing device configured to:
  determine, by at least one processor, a signal strength for a wireless signal associated with a first wireless communication network;
  identify, by the at least one processor, a plurality of factors that contribute to a user experience;
  identify, by the at least one processor, a weight stored in a memory;
  identify, by the at least one processor, a corresponding first factor of the plurality of factors;
  determine, by the at least one processor, a first set of measurements corresponding to the first factor, wherein the first set of measurements pertains to the user experience in connection with a first wireless communication network;
  determine, by the at least one processor, a first user experience indicator for the first wireless communication network based at least in part on the first set of measurements weighted according to the weight;
  determine, by the at least one processor, a second set of measurements corresponding to the first factor, wherein the second set of measurements pertains to the user experience in connection with a second wireless communication network;
  determine, by the at least one processor, a second user experience indicator for the second wireless communication network based at least in part on the second set of measurements weighted according to the weight;
  display, by a display device, the first user experience indicator to indicate the user experience in connection with the first wireless communication network;
  display, by the display device, the second user experience indicator to indicate the second user experience in connection with the second wireless communication network; and
  display, by the display device, a signal strength indicator to indicate the signal strength for the wireless signal, wherein:
    the signal strength indicator is based at least in part on the signal strength and a type of the first wireless communications network,
    the signal strength indicator is displayed in a same banner area as the first user experience indicator and the second user experience indicator, and
    the plurality of factors are different than the signal strength and the type of the first wireless communications network;
  display, by the display device, a prompt for a selection of the first wireless communication network or the second wireless communication network; and
  select, based at least in part on an input associated with the prompt, the first wireless communication network.

6. The system of claim 5, wherein the first user experience indicator and the second user experience indicator comprises at least one of a bar displayed on a screen of a user device, a numerical value, a light emitted from an LED, an audible indicator, a haptic indicator, or text.

7. The system of claim 5, wherein the plurality of factors comprise two or more of:
  a time of day;
  a power level of a user device;
  a location of the user device;
  a temperature of the user device;
  a proximity of the user device to the user;
  a cost associated with the first wireless communication network or the second wireless communication network;
  a communication state of the user device;
  a security preference;
  one or more preferences of an application on the user device;
  a queue length of the user device; or
  an error rate of data transmitted or received by the user device.

8. The system of claim 5, wherein the plurality of factors are identified based on one or more preferences of an application that is using the first wireless communication network.

9. A non-transitory computer-readable storage medium comprising executable instructions that, when executed by a processing device, cause a processing device to perform operations comprising:
  determine a signal strength for a wireless signal received from a first wireless communication network;
  identify a plurality of factors that contribute to a user experience;
  identify a weight stored in a memory;
  identify a corresponding first factor of the plurality of factors;
  determine a first set of measurements corresponding to the first factor, wherein the first set of measurements pertains to the user experience in connection with the first wireless communication network;
  determine a first user experience indicator for the first wireless communication network based at least in part on the first set of measurements weighted according to the weight;
  determine a second set of measurements corresponding to the first factor, wherein the second set of measurements pertains to the user experience in connection with a second wireless communication network;
  determine a second user experience indicator for the second wireless communication network based at least in part on the second set of measurements weighted according to the weight;
  display the first user experience indicator to indicate the user experience with the first wireless communication network;
  display the second user experience indicator to indicate the second user experience in connection with the second wireless communication network;
  display a signal strength indicator to indicate the signal strength for the wireless signal, wherein:
    the signal strength indicator is based on the signal strength of the first wireless communications network and a type,
    the signal strength indicator is displayed in a same banner area as the first user experience indicator and the second user experience indicator, and
    the plurality of factors are different than the signal strength and the first type of the wireless communications network;
  display, by the display device, a prompt for a selection of the first wireless communication network or the second wireless communication network; and
  select, based at least in part on an input associated with the prompt, the first wireless communication network.

10. The non-transitory computer-readable storage medium of claim 9, wherein the first user experience indicator and the second user experience indicator comprises one or more of a bar displayed on a screen of a user device, a numerical value, a light emitted from an LED, an audible indicator, a haptic indicator, or text.

11. The non-transitory computer-readable storage medium of claim 9, wherein the plurality of factors comprise two or more of:
- a time of day;
- a power level of a user device;
- a location of the user device;
- a temperature of the user device;
- a proximity of the user device to the user;
- a cost associated with the first wireless communication network or the second wireless communication network;
- a communication state of the user device;
- a security preference;
- one or more preferences of an application on the user device;
- a queue length of the user device; or
- an error rate of data transmitted or received by the user device.

12. The non-transitory computer-readable storage medium of claim 9, wherein the plurality of factors are identified based on one or more preferences of an application that is using the first wireless communication network.

13. The method of claim 1, wherein the first user experience indicator or the second user experience indicator are displayed adjacent an icon associated with an application.

14. The method of claim 1, further comprising:
- determining the first user experience indicator for a first application when the first application is utilizing the first wireless communication network;
- determining the second user experience indicator for the first application when the first application is utilizing the second wireless communication network; and
- displaying the first user experience indicator for the first application and the second user experience indicator for the first application.

15. The method of claim 14, further comprising:
- determining the first user experience indicator associated with a second application when the second application is utilizing the first wireless communication network;
- determining the second user experience indicator associated with the second application when the second applications is utilizing the second wireless communication network; and
- displaying the first user experience indicator associated with the second application and the second user experience indicator associated with the second application.

* * * * *